Patented June 23, 1931

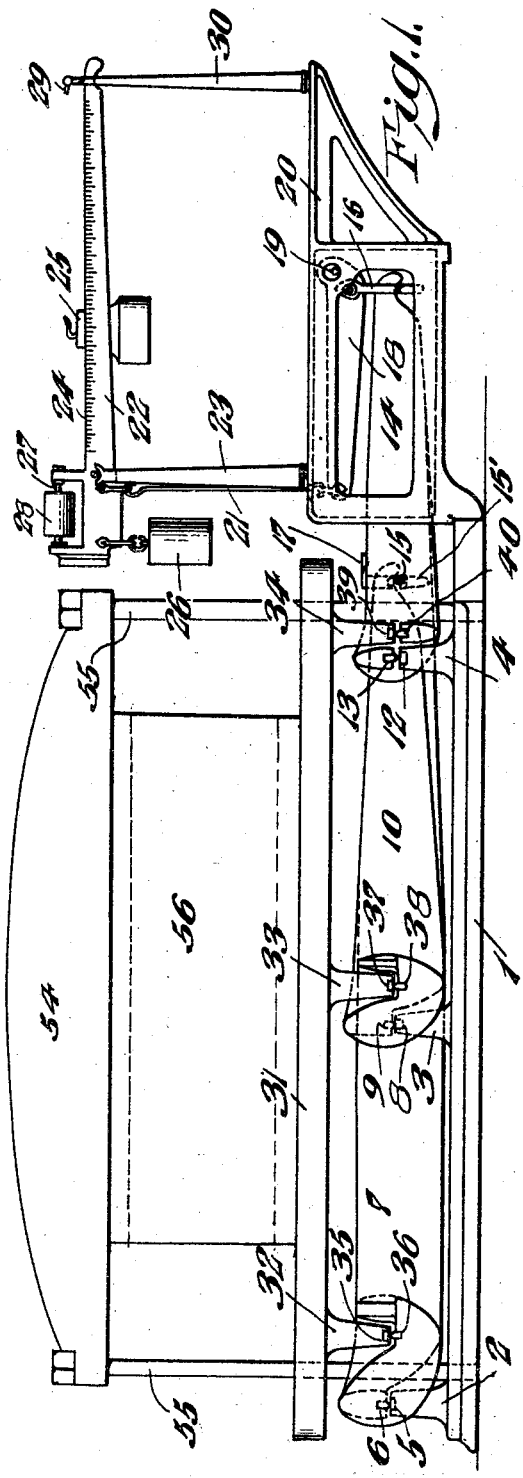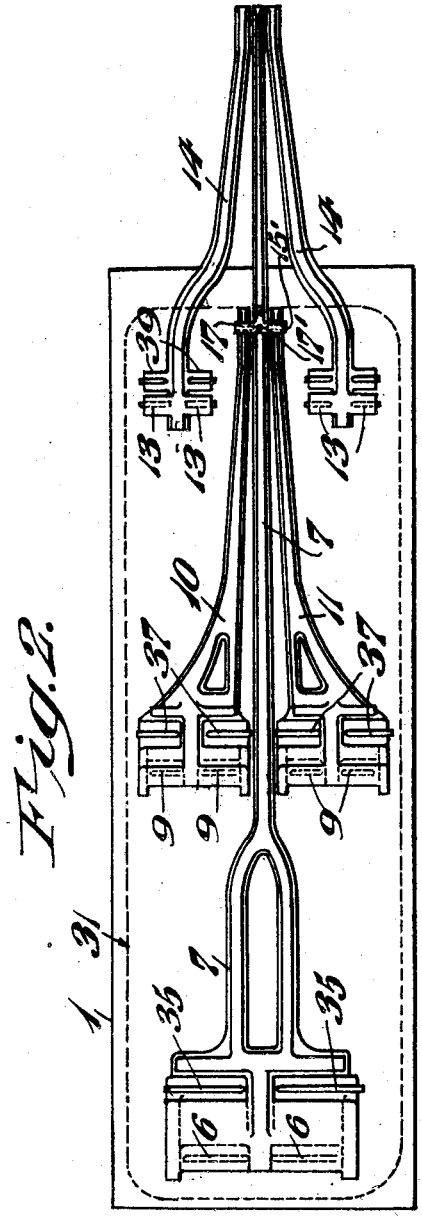

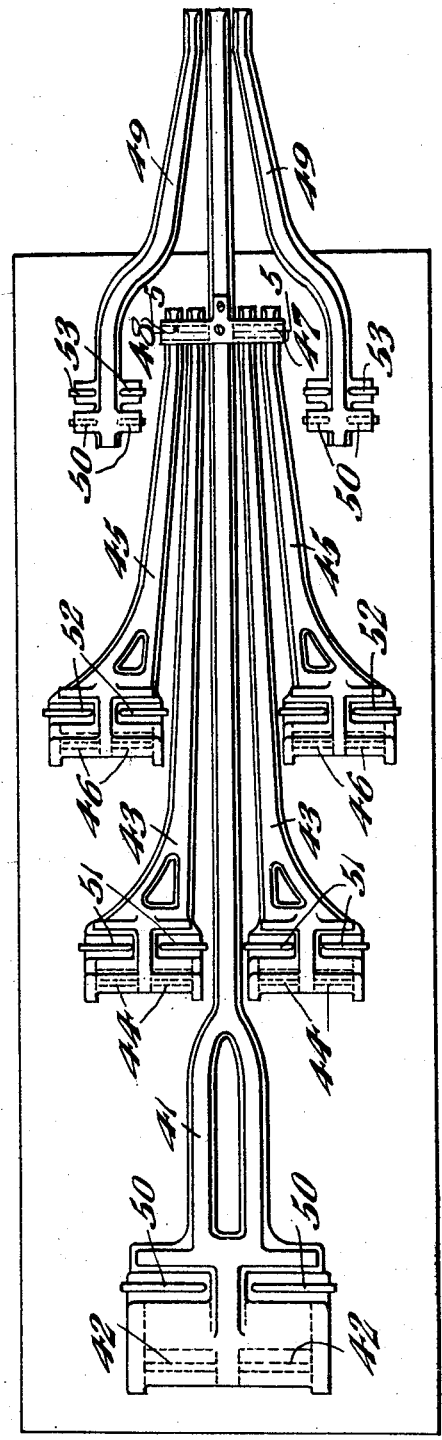

1,811,210

UNITED STATES PATENT OFFICE

TINIUS OLSEN, OF PHILADELPHIA, PENNSYLVANIA, ASSIGNOR TO TINIUS OLSEN TESTING MACHINE CO., OF PHILADELPHIA, PENNSYLVANIA, A CORPORATION OF PENNSYLVANIA

LEVER FOR TESTING MACHINE WEIGHING SYSTEMS

Application filed November 20, 1926. Serial No. 149,578.

In testing machines for weighing, balancing, and other purposes it has been customary to employ a four corner platform lever support.

A leverage system of this character is impractical where very large weights and bulky material are to be tested, because the platform is of such length as well as the distance between the support of the fulcrum that it will distort under the load which it carries, and thus produce an incorrect reading. Furthermore, if an excessive weight is placed on the platform at the wrong location, the lever and its fulcrum owing to distortion of the levers and platforms are injured to such an extent that the machine is useless for accurate work.

The object of my present invention is to devise a novel lever system adapted for use in testing machines used for weighing or stress recording purposes where the breaking strain on the specimen or material to be weighed or tested is several hundred thousand pounds and where specimens for ascertaining weight, or breaking strains of the specimens, are large or bulky, such as, for example, high pressure concrete pipes.

With the above and other objects in view as will hereinafter more clearly appear, my invention comprehends a novel construction of a supporting lever system for testing machines.

It further comprehends a novel construction and arrangement of a testing machine wherein a plurality of levers have their fulcrums in spaced relationship longitudinally of the machines and are arranged in overlapping relationship.

It further comprehends a novel construction and arrangement of lever systems wherein a plurality of overlapping levers are employed having their fulcrums in substantially the same plane, and in spaced relationship, so that the article or material to be tested can be placed at any desired location on the platform of the machine without injury thereto and without producing distortion of the levers and platform and inaccurate readings.

Other novel features of construction and advantage will hereinafter more clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only, and that the various instrumentalities of which my invention consists can be variously arranged and organized, and the invention is not, therefore, limited to the precise arrangement and organization of these instrumentalities as herein set forth.

Figure 1 is a side elevation of a machine embodying my invention.

Figure 2 is a top plan view of the lever system, certain parts being removed for the sake of clearness of illustration.

Figure 3 is an enlarged detail view.

Figure 4 is a top plan view, similar to Figure 2, of another embodiment of my invention.

Figure 5 is a section on line 5—5 of Figure 4.

Similar numerals of reference indicate corresponding parts.

Referring to the drawings:—

1 designates a base or supporting foundation provided with the upwardly extending fulcrum supports 2, 3 and 4, respectively. The fulcrum supports 2 have seated therein fulcrum blocks 5 which co-operate with the knife edges or fulcrum members 6 at the rear end of a main lever 7 which extends longitudinally of the machine and is adapted preferably on its median line.

The fulcrum posts 4, are provided with the fulcrum blocks 12 with which co-operate the fulcrum members 13 which are carried by levers 14.

The fulcrumed supports 3 are disposed intermediate the ends of the machine and are provided with the fulcrum blocks 8 which co-operate with the fulcrumed members 9 carried by a pair of levers 10 and 11, respectively, and disposed on opposite sides of the main lever 7.

The forward ends of the levers 10 and 11 are supported on fulcrums 15 on lugs 15' projecting from opposite sides of the lever 7. The forward end of the main lever 7 terminates at the same place as the termination of the levers 14. A bracket 17 is fixed to the lever 7 by fastening devices 17' and retains the forward ends of the levers 10 and 11 in their proper positions so that under disturbance they will not leave such positions.

The lever 7 and the levers 14 are adapted to receive a connecting link 16 which is pivotally connected with a lever 18 fulcrumed at 19 on raised portions 20 of the base 1.

The lever 18 is connected by means of a link 21 with a scale beam 22, fulcrumed on a post 23 rising from the raised base portion 20 of the base 1. The scale beam 22 has scale markings, as at 24, and is provided with an adjustable weight 25, slidably mounted thereon. The scale 22 is also provided with a counter weight 26 and with a threaded rod 27 with which an adjustable weight 28 is in threaded engagement.

The scale beam 22 can be locked in position by means of a manually actuated locking member 29 fulcrumed on a post 30 rising from the raised portion 20 of the base 1.

31 designates the platform on which the material or specimen to be weighed or tested is placed. This platform is provided with fulcrum supporting members 32, 33, and 34, respectively. The members 32 carries fulcrum blocks 35 with which co-operate fulcrum members 36 carried by the lever 7.

The member 33 carries blocks 37 with which co-operate fulcrum members 38 carried by the levers 10 and 11.

In a similar manner, the depending member 34 is provided with blocks 39 with which co-operate fulcrum members 40 carried by the levers 14.

It will thus be seen that the lever system is uniformly distributed throughout the length of the weighing platform 31 in such a manner that the levers will support in unison the loads placed on them, and thus cause no inaccurate readings.

The construction shown in Figures 1 and 2 has been designed to take care of a maximum breaking strain on the specimens of three hundred thousand pounds, while the construction seen in Figure 4 is designed to take care of breaking strains on the specimens up to one million pounds, without rendering inaccurate the readings on the scale, or injury to the lever system.

In the embodiment seen in Figure 4, the rear or centre lever 41 is fulcrumed at 42 on the base and extends forwardly between a pair of levers 43 fulcrumed at 44 and a pair of levers 45 fulcrumed at 46, and such levers 41, 43 and 45 are supported pivotally on lugs 48 projecting from the sides of the levers 41. The bracket 47 is similar in construction and function to the bracket 17 in Figures 1 and 2 and is fixed to the main lever 41. The forward end of the lever 41 terminates at the same point as a pair of levers 49 fulcrumed at 50 on the machine base.

The levers seen in Figure 4 are provided with fulcrumed members 50, 51, 52 and 53 which support a platform in a manner similar to that shown in Figure 1, as will be understood by those skilled in this art.

In order to illustrate one typical manner in which the stresses and strains can be imparted to the test specimen, I have shown in Figure 1 a crosshead 54, operated by straining rods 55, which are given a vertical movement by any desired or conventional type of operating mechanism in or below the base 1. A specimen 56 is placed between the crosshead 54 and the platform 31, and such specimen may be, for example, a section of concrete pipe which is to be subjected to a crushing load. The resistance or amount of load such specimen can withstand is through the scale lever system and is recorded on the scale beam 22.

It is to be understood that similar means would be employed in the embodiment seen in Figure 4 to impart the desired stresses and strains to the specimen under test.

It will be apparent from the foregoing that in accordance with my present invention, I provide a lever supporting system for the platform or other arrangement which carries the specimens or materials which are to be tested, such system comprising a plurality of levers having their fulcrums in longitudinally spaced relationship and preferably in a common plane.

For purpose of illustration only, I have preferred to show a main lever fulcrumed at one end with a pair of levers fulcrumed at the other end of the scale and with a plurality of intermediate levers fulcrumed intermediate the ends of the machine with all of such levers operatively connected so that they will move in unison to actuate a scale beam or other registering mechanism.

The intermediate levers and the front levers are preferably disposed in overlapping relationship with respect to the main lever, and the system of levers is operatively connected together in such a manner that they will move in unison so that the likelihood of the levers distorting under load or strain is overcome.

Having thus described my invention what I claim as new and desire to secure by Letters Patent, is:—

1. In a testing machine weighting mechanism having the conventional four-corner platform supports formed by a main lever and forward end levers fulcrumed on opposite sides of the main lever, intermediate levers between the end levers and the main lever, and fulcrumed on opposite sides of the main lever, and connected therewith at their forward ends, all of said levers having their effective power applied at the same point.

2. In a testing machine weighing mechanism having the conventional four-corner platform supports formed by a main lever and forward end levers fulcrumed on opposite sides of the main lever, intermediate levers between the end levers and the main lever, and fulcrumed on opposite sides of the main lever, and connected therewith at their forward ends, all of said levers having their effective power applied at the same point, and the fulcrums of all of said levers being in longitudinally spaced relationship.

3. In a testing machine weighing mechanism having the conventional four-corner platform support formed by a main lever and end levers fulcrumed beneath the ends of the platform, intermediate levers intermediate the ends of said supports operatively connected therewith and fulcrumed on opposite sides of said main lever and connected with it, the effective power of all of said levers being applied at a common point, and registering mechanism actuated by said levers.

TINIUS OLSEN.